United States Patent [19] [11] 3,904,433
Frazier [45] Sept. 9, 1975

[54] STORAGE BATTERY HAVING SPIRAL ELECTRODES

[76] Inventor: Wallace N. Frazier, 111 Richland Ave., Smyrna, Tenn. 37176

[22] Filed: Oct. 29, 1974

[21] Appl. No.: 518,258

[52] U.S. Cl. .................................. 136/14; 136/26
[51] Int. Cl.² ...................................... H01M 35/04
[58] Field of Search ....................... 136/26, 13, 14

[56] References Cited
UNITED STATES PATENTS
2,487,499  11/1949  Webb .................................. 136/13
3,472,696  10/1969  Shoeld ................................ 136/13

Primary Examiner—John H. Mack
Assistant Examiner—C. F. Lefevour
Attorney, Agent, or Firm—Harrington A. Lackey

[57] ABSTRACT

A lead-acid type storage battery including two substantially identical cells, each cell being formed from an elongated electrode plate and an elongated insulator strip spirally wound about a common axis, the cells being coaxially spaced apart within an electrolyte.

7 Claims, 8 Drawing Figures

PATENTED SEP 9 1975  3,904,433
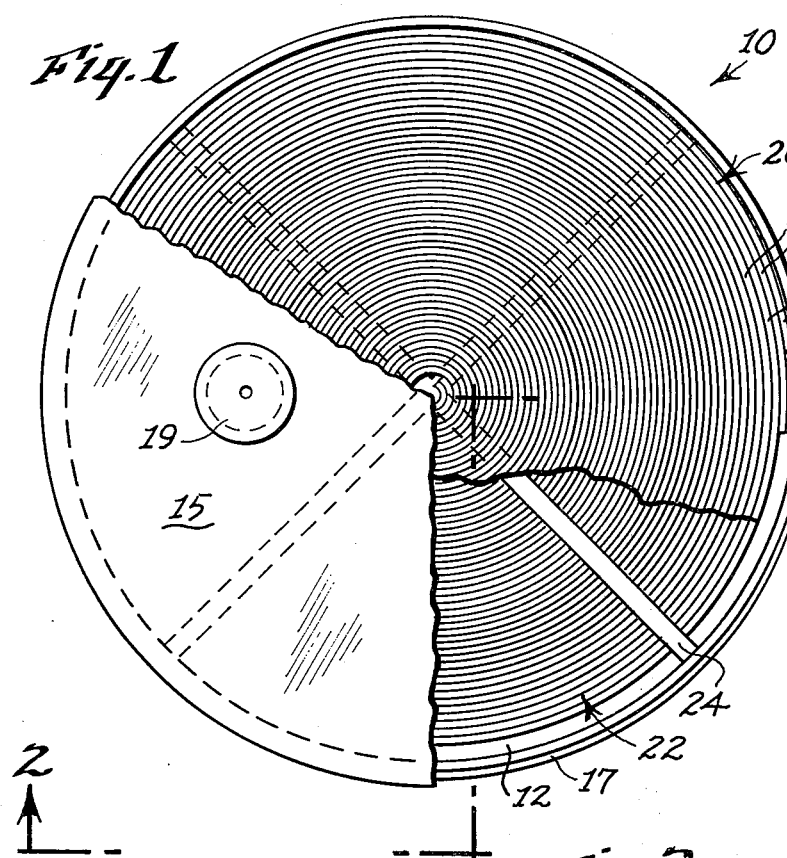
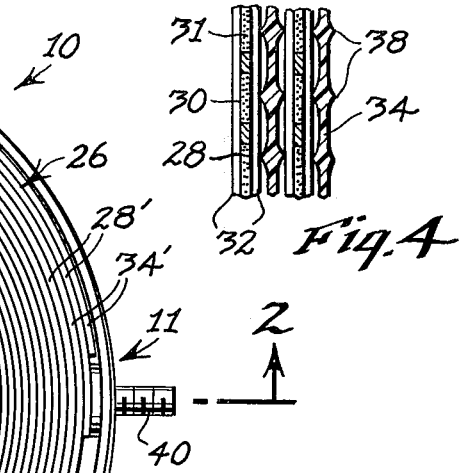
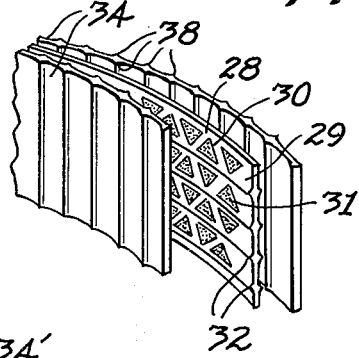
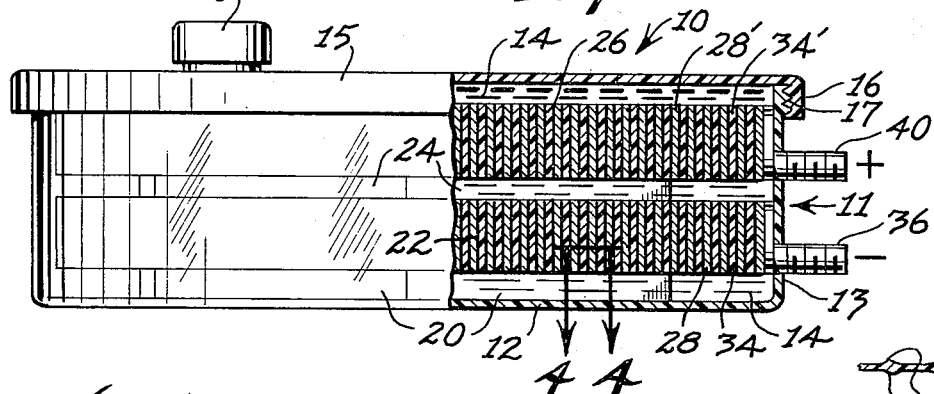
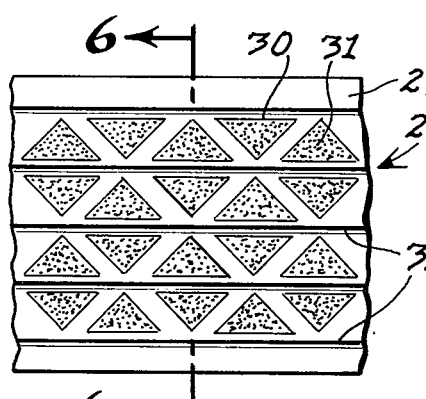
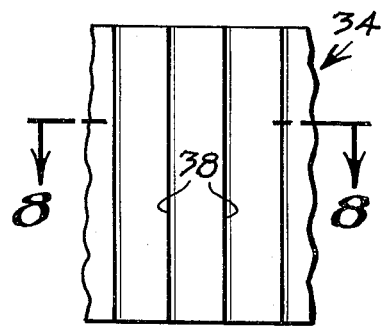

3,904,433

STORAGE BATTERY HAVING SPIRAL ELECTRODES

BACKGROUND OF THE INVENTION

This invention relates to a battery, and more particularly to a lead-acid storage battery having spaced spirally wound cells.

Lead-acid storage batteries having spaced electrode plates made of thin lead grid and lead oxide paste immersed in a sulphuric acid electrolyte are well-known in the art.

Also known in the art are lead-acid storage batteries having cells in which the electrodes and insulators are spirally wound, such as the Enos U.S. Pat. No. 385,580; the Webb U.S. Pat. No. 2,487,499; and the Shoeld U.S. Pat. Nos. 3,395,043 and 3,472,696.

However, in each of the spirally wound electrode cells disclosed in each of the above patents, a positive electrode strip or plate and a negative electrode strip or plate are spirally wound in the same coil or cell, which provides a rather lengthy circuit for the ions.

SUMMARY OF THE INVENTION

It is therefore an object of this invention to provide a lead-acid storage battery having spirally wound electrode cells, in which the positive electrode plate appears only in one cell and the negative electrode plate appears in the second cell which is axially spaced from the first cell.

The electrode strips are made from a conventional lead grid having holes therein and covered by lead oxide paste. However, the electrode plates in both cells may be structurally identical and capable of receiving either a positive or a negative charge. Thus, the charge on any electrode plate depends upon what charge is impressed upon it, the electrode in the other cell having the opposite charge.

It is also within the scope of this invention to provide an elongated insulator strip to be spirally wound with each electrode plate in which one or both surfaces of the insulator strip have circumferentially spaced axially disposed ribs. Grooves or valleys are defined between the ribs to facilitate the axial passage of the liquid electrolyte between the respective surfaces of the insulator strip and their adjoining electrode plates.

The spirally wound cells are preferably mounted coaxially within a solid casing or housing and immersed in sulphuric acid. The cells are separated from each other and from the bottom wall by spacers. The housing or casing is also provided with a detachable lid so that either or both cells may be easily removed, inserted, replaced or repaired.

The disposition of the spirally wound electrode cells are such that there is substantial economy in space, construction, time and labor, not only in the original construction of the battery and the cells, but also in the replacement of the cells.

There is also a more efficient transfer of ions between the cells in the battery made in accordance with this invention. Moreover, this battery can be charged and discharged faster than conventional batteries.

Because of the simplicity in the replacement of the cells, a battery may be repaired and maintained in the field without resort to a trip to a service station.

Since the electrode plates are identical in each cell, any cell can be replaced by another cell, regardless of whether the electrode in that particular cell functions as a positive or negative electrode after it is charged.

BRIEF DESCRIPTION OF THE DRAWINGS

FIG. 1 is a top plan view of a battery made in accordance with this invention, with portions broken away;

FIG. 2 is a side elevation, partially in section, taken along the line 2—2 of FIG. 1;

FIG. 3 is a fragmentary perspective view of the end portions of one of the electrode plates sandwiched between a pair of insulator strips, made in accordance with this invention;

FIG. 4 is an enlarged fragmentary section taken along the line 4—4 of FIG. 2;

FIG. 5 is an enlarged fragmentary side elevation of an electrode plate;

FIG. 6 is a section taken along the line 6—6 of FIG. 5;

FIG. 7 is an enlarged fragmentary side elevation of an insulator strip; and

FIG. 8 is a section taken along the line 8—8 of FIG. 7.

DESCRIPTION OF THE PREFERRED EMBODIMENT

Referring now to the drawings in more detail, FIGS. 1 and 2 disclose a battery 10 made in accordance with this invention, including a housing or casing 11 having a bottom wall 12 and a side wall 13, preferably cylindrical and integral with the bottom wall 12. Moreover, the walls 12 and 13 of the casing 11 are made of a material which is not only an electrical insulator, but is also inert to the electrolyte contained with the casing 11, and more specifically the sulphuric acid electrolyte 14 preferably used in the battery 10.

The upper end of the casing 11 is preferably open and adapted to be covered by a disc-shaped lid, cover, or top 15. As disclosed in FIG. 2, the top 15 is provided with an annular flange 16, internally threaded to threadedly engage the threads 17 formed on the outer surface of the upper rim of the side wall 13. Thus, by unscrewing the top or cap 15, the interior of the casing 11 is readily accessible. The top 15 is also provided with a vent cap 19 to permit venting of the sulphuric acid fumes when the top 15 is closed.

Mounted within the casing 11 upon the radially disposed bottom spacer arms 20 is a first or lower cell 22. Separated from the lower cell 22 by a set of intermediate radially disposed spacer arms 24 is a second or upper cell 26. The top of the cell 26 is spaced from the bottom surface of the lid 15, while the outer or peripheral surfaces of the cells 22 and 26 may be spaced from the side wall 13.

The bottom spacer arms 20 and intermediate spacer arms 24 are made from electrically insulationg material. The spacer arms 20 and 24 are disclosed in the drawings as being disposed 90° apart. However, the particular form of the spacers 20 and 24 is not material, so long as they space the respective cells 22 and 26 from each other and from the bottom wall 12.

Also in the preferred form of the invention, the spacer elements 20 and 24 are not attached to the cells 22 and 26, so that when the top 15 is removed from the casing 11, each cell 22 and 26 may be easily removed from the interior of the casing 11.

The first or lower cell 22 is formed from a single elongated flexible, electrode plate or strip 28. The electrode strip 28 may be made from a solid strip or foil of lead 29 forming a grid or latticework including holes 30 which are filled with a conventional lead oxide paste 31. The structure of the electrode plate or strip 28 may be conventional for the lead oxide paste foils and strip now used in lead-acid storage batteries. As disclosed in the drawings, particularly FIGS. 5 and 6, the exterior surfaces of the electrode strip 28 are provided with vertically spaced, longitudinally disposed ribs 32.

The lower coil 22 also includes an elongated, flexible strip of insulating material, such as fiberglass, of substantially the same width, and also preferably about the same length, as the electrode strip 28. The electrode strip 28 and the insulator strip 34 are placed longitudinally face-to-face with their edges substantially flush and wound in a spiral coil about a common axis to form the cell 22. The outer end portion of the electrode strip 28 is electrically connected to a lower terminal 36, which preferably projects through a corresponding opening in the side wall 13, such hole being sealed against any leakage through the side wall 13.

In the preferred form of construction, longitudinally or circumferentially spaced vertical ribs 38 are formed in either or both side surfaces of the insulator tape or strip 34. Thus, the ribs 38 when engaging the opposed surfaces of the coiled electrode strip 28 provide valleys or vertical passages for the liquid electrolyte 14 to more adequately expose the lead 28 and lead oxide paste 31 to the sulphuric acid electrolytes 14. The longitudinal or horizontal ribs 32 in the electrode strip 28 also provide a similar function to permit the electrolyte to be channeled circumferentially around the electrode strip 28 from the vertical channels between the vertical ribs 38 on the insulator strips 34.

The upper or second cell 26 is preferably made identical to the lower cell 22, so that if desired, the cells 22 and 26 might be interchangeable, not only with themselves, but also with other replacement cells. Thus, as disclosed in FIG. 2, the upper cell 26 is comprised of a single elongated electrode strip 28' and a single elongated insulator strip 34', substantially the same width and length, spirally coiled about a common axis, with the outer portion of electrode strip 28' being electrically connected to the upper terminal 40. The upper cell 26 is disposed within the casing 11 spaced vertically above, and coaxial with, the lower cell 22.

Thus, there is only a single electrode within each coil or cell 22 and 26. When the cells 22 and 26 are mounted within the casing 11 and spaced by the respective spacer elements 20 and 24 immersed within the liquid sulphuric acid electrolyte 14 with the lid 15 secured in place, either terminal 36 or 40 may be connected to the positive or negative electrode of a charging machine, or vice versa. As disclosed in FIG. 2, a positive charge arbitrarily may be impressed upon the upper cell through the terminal 40, and therefore the lower cell 22 will be charged negatively.

Since the intermediate space between the cells 22 and 26 is filled with electrolyte 14, a greater number of ions may flow between the respective charged electrode strips 28' and 28 within the respective cells 26 and 22. This arrangement of the spirally wound cells 26 and 22 exposes more electrode surfaces to the electrolyte and presents a comparatively short path for the ions to travel through the electrolyte between the respective electrode surfaces in the upper and lower cells 26 and 22. Thus, the cells 26 and 22 not only will be more rapidly charged and and discharged, but will also have the capability of developing a higher potential within a smaller amount of space than conventional lead-acid storage batteries, of either the conventional parallel-plate type or even the spirally-wound type. It is believed that the battery 10 is capable of developing a voltage approximately three times greater than that of the conventional lead-acid storage battery occupying the same amount of space.

The elements incorporated in the battery 10 also lend themselves to simplicity in construction and assembly. Moreover, the disposition of the cells 26 and 22 within the casing 11 permit ready accessibility for insertion, removal, inspection, replacement and repair. Since each cell 26 and 22 is located independently of each other and the positive electrode and the negative electrode plates are located in different cells, the damage to one cell will not affect the other, and the damaged cell may be easily removed and replaced without damaging the other cell.

Since the cells 22 and 26 may be so easily replaced, even an unskilled user of the battery could, in most instances, restore the battery 10 to its full operating capacity if one cell were damaged, by carrying spare cells with him for replacement.

The side wall 13, and also the bottom wall 12, if desired, may be made of transparent material, such as glass or an appropriate plastic, such as acrylic resin, to permit an observer to clearly view the interior of the battery 10, to determine the level of liquid electrolyte 14 within the casing 11, or to detect damage in one of the cells 22 or 26, or for any other reason.

What is claimed is:

1. A storage battery comprising:
   a. an electrically insulated housing adapted to receive an electrolyte,
   b. first and second cells within said housing,
   c. each of said cells comprising an elongated electrode plate and an elongated insulator strip, said plate and strip being spirally coiled about a common axis,
   d. intermediate spacer means separating said first and second cells coaxially of each other to form a space between said cells,
   e. an electrolyte within said space and in electrical communication with both said cells,
   f. a first terminal electrically connected to the electrode plate in said first cell, and
   g. a second terminal electrically connected to the electrode plate in said second cell.

2. The invention according to claim 1 in which the electrode plates in both of said cells are made from substantially the same material, either of which is adapted to receive a positive or a negative charge.

3. The invention according to claim 1 in which said first and second terminals project outward through the wall of said housing.

4. The invention according to claim 2 in which said electrolyte is sulphuric acid and said housing is a solid container adapted to receive said sulphuric acid to a depth completely immersing both said cells, and said electrode plates are made of metallic materials which will react with sulphuric acid to create an electrical voltage between said cells.

5. The invention according to claim 4 in which said electrode plates comprise lead- grid-work having holes therethrough filled with lead oxide paste.

6. The invention according to claim 1 in which each of said insulator strips has at least one surface comprising circumferentially spaced axial ribs to facilitate the axial flow of liquid electrolyte between said surface and an adjoining electrode plate.

7. The invention according to claim 1 in which said housing comprises a substantially cylindrical container having a solid bottom wall, an annular side wall and an open top, bottom spacer means on said bottom wall supporting said first cell coaxially within said cylindrical container, said container being filled with said electrolyte, and cover means detachably connected to said housing to cover said open top.

* * * * *